US011984100B2

(12) United States Patent
Hierholzer

(10) Patent No.: US 11,984,100 B2
(45) Date of Patent: May 14, 2024

(54) STRINGED INSTRUMENT OR STRINGED INSTRUMENT PICK DESIGN AND METHOD OF MANUFACTURE

(71) Applicant: Lawrence J. Hierholzer, Trabuco Canyon, CA (US)

(72) Inventor: Lawrence J. Hierholzer, Trabuco Canyon, CA (US)

( * ) Notice: Subject to any disclaimer, the term of this patent is extended or adjusted under 35 U.S.C. 154(b) by 0 days.

(21) Appl. No.: 17/163,499

(22) Filed: Jan. 31, 2021

(65) Prior Publication Data

US 2021/0225337 A1 Jul. 22, 2021

Related U.S. Application Data

(63) Continuation of application No. 15/968,590, filed on May 1, 2018, now Pat. No. 10,937,397, which is a continuation-in-part of application No. 15/268,530, filed on Sep. 16, 2016, now Pat. No. 9,959,847.

(60) Provisional application No. 62/289,098, filed on Jan. 29, 2016, provisional application No. 62/219,632, filed on Sep. 16, 2015.

(51) Int. Cl.
*G10D 3/173* (2020.01)

(52) U.S. Cl.
CPC .................................... *G10D 3/173* (2020.02)

(58) Field of Classification Search
CPC ...................................................... G10D 3/173
See application file for complete search history.

(56) References Cited

U.S. PATENT DOCUMENTS

| | | | | | |
|---|---|---|---|---|---|
| 1,184,561 | A * | 5/1916 | Napoletano | G10D 3/173 84/322 |
| 1,461,070 | A * | 7/1923 | Rudesyle | G10D 3/173 84/322 |
| 2,170,179 | A * | 8/1939 | Wolcott | G10D 3/173 84/322 |
| 2,481,759 | A * | 9/1949 | Lawrence | G10D 3/173 84/322 |
| 2,484,820 | A * | 10/1949 | Hyman | G10D 3/173 84/322 |
| 3,735,663 | A | 5/1973 | Cowell | |
| 4,625,615 | A | 12/1986 | Lukehart | |
| 4,711,150 | A * | 12/1987 | Hyduck | G10D 3/173 84/322 |
| D310,233 | S * | 8/1990 | Farnell, Jr. | D17/20 |
| D317,617 | S * | 6/1991 | Mutti | 84/322 |
| D330,905 | S * | 11/1992 | Thomas | 84/322 |
| 5,307,723 | A | 5/1994 | De La | |
| 5,610,349 | A | 3/1997 | Fogarty et al. | |
| 5,648,622 | A * | 7/1997 | Storey | G10D 3/173 84/322 |
| 5,859,377 | A * | 1/1999 | Mackey | G10D 3/173 84/322 |

(Continued)

*Primary Examiner* — Robert W Horn
(74) *Attorney, Agent, or Firm* — Kari L. Barnes

(57) ABSTRACT

Exemplary embodiments described herein are directed at instruments and instrument accessories and their associated designs and methods of manufacture based on contoured surfaces and their acoustic properties. Exemplary embodiments may be used to broaden the basic design of stringed instruments or stringed instrument picks or the associated accessories to include forms in three dimensions or using and optimizing the acoustic and/or strength properties inherent in an infinite variety of shapes and sizes.

20 Claims, 6 Drawing Sheets

(56) References Cited

U.S. PATENT DOCUMENTS

| | | | | | |
|---|---|---|---|---|---|
| 6,130,374 | A * | 10/2000 | Polidori | G10D 3/173 84/322 |
| 6,346,662 | B1 * | 2/2002 | Sielaff | G10D 3/173 84/322 |
| 6,815,597 | B1 * | 11/2004 | Bosley | G10D 3/173 84/322 |
| 7,067,729 | B2 * | 6/2006 | Leong | G10D 3/173 84/322 |
| 7,238,869 | B1 * | 7/2007 | Kleckzka | G10D 3/173 84/322 |
| 7,265,285 | B2 * | 9/2007 | Storey | G10D 3/173 84/322 |
| 7,683,245 | B2 * | 3/2010 | Judd | G10D 3/173 84/322 |
| 7,718,874 | B2 * | 5/2010 | Cheok | G10D 3/173 84/320 |
| 7,786,362 | B1 | 8/2010 | Whetstine | |
| 7,825,315 | B1 * | 11/2010 | King | G10D 3/173 84/322 |
| 8,035,017 | B1 * | 10/2011 | Morris | G10D 3/173 84/320 |
| 8,178,767 | B1 * | 5/2012 | King | G10D 3/173 84/322 |
| D673,999 | S * | 1/2013 | Walker | D17/20 |
| 8,426,710 | B2 * | 4/2013 | Georgatos | G10D 3/173 84/320 |
| D688,736 | S * | 8/2013 | Lilly | D17/20 |
| 8,648,239 | B2 * | 2/2014 | Tommasi | G10D 3/173 84/322 |
| 8,664,498 | B2 | 3/2014 | Leneman | |
| 9,263,007 | B2 * | 2/2016 | Goble | G10D 3/173 |
| 9,418,632 | B2 * | 8/2016 | Snyder | G10D 3/173 |
| 9,576,561 | B2 | 2/2017 | Thompson et al. | |
| 9,691,365 | B2 * | 6/2017 | Pascale | G10D 3/173 |
| 9,747,874 | B2 | 8/2017 | Holm et al. | |
| 9,947,300 | B2 | 4/2018 | Altavilla et al. | |
| 9,959,847 | B2 | 5/2018 | Hierholzer | |
| 10,937,397 | B2 * | 3/2021 | Hierholzer | G10D 3/173 |
| 2007/0079685 | A1 * | 4/2007 | Mizek | G10D 3/173 84/322 |
| 2007/0087795 | A1 * | 4/2007 | Aletto | G06V 40/10 462/1 |
| 2009/0084244 | A1 * | 4/2009 | Goad | G10D 3/173 84/320 |
| 2011/0056360 | A1 * | 3/2011 | Ouellette | B29C 39/10 84/322 |
| 2011/0283862 | A1 * | 11/2011 | Tracy | G10D 3/173 84/322 |
| 2013/0092008 | A1 * | 4/2013 | Murphy | G10D 3/173 84/322 |
| 2014/0144308 | A1 | 5/2014 | Holm et al. | |
| 2014/0202309 | A1 * | 7/2014 | Gauthier | G10D 3/173 84/320 |
| 2016/0071499 | A1 * | 3/2016 | Wardwell | G10D 3/173 84/322 |
| 2016/0180824 | A1 | 6/2016 | Mearini et al. | |
| 2017/0011720 | A1 | 1/2017 | Pascale | |
| 2017/0084254 | A1 * | 3/2017 | Altavilla | G10D 3/173 |
| 2017/0103737 | A1 * | 4/2017 | Hierholzer | G10D 3/173 |
| 2018/0247619 | A1 * | 8/2018 | Hierholzer | G10D 3/173 |

* cited by examiner

FIG. 1A
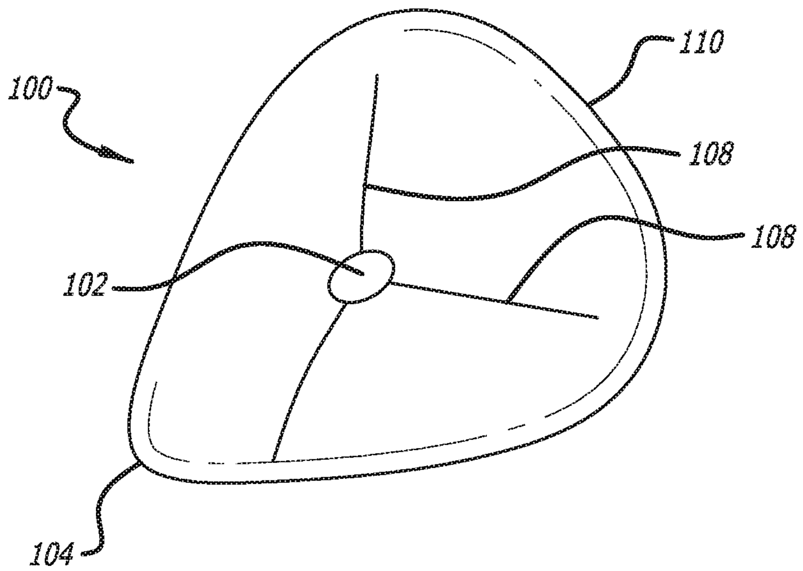
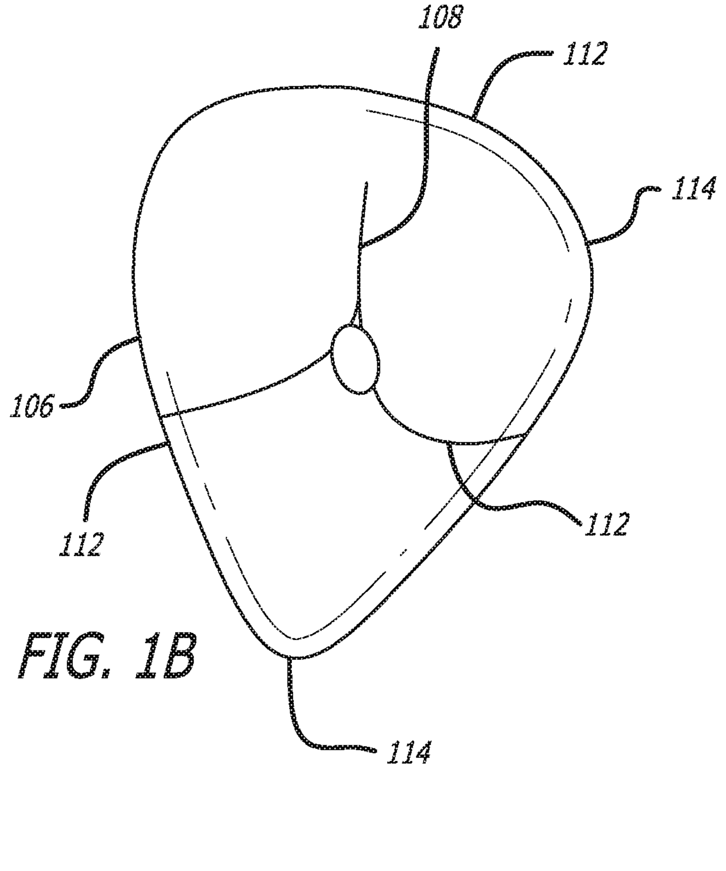
FIG. 1B

STRINGED INSTRUMENT OR STRINGED INSTRUMENT PICK DESIGN AND METHOD OF MANUFACTURE

PRIORITY

This application claims is a continuation-in-part of U.S. application Ser. No. 15/268,530, filed Sep. 16, 2016, and issued as U.S. Pat. No. 9,959,847, which claims priority to U.S. Provisional Application No. 62,219,632, filed Sep. 16, 2015, and U.S. Provisional Application No. 62,289,098, filed Jan. 29, 2016, each of which is incorporated by reference in its entirety into this application.

BACKGROUND

Conventional instruments and instrument accessories are generally flat and one-dimensional. For example, a guitar pick is typically a stamped triangular form from a plastic sheet. The edges may be smoothed, but the lateral sides, or gripping surfaces are flat or planar. Similarly, guitar bodies are generally made of planar surfaces for at least the front and back faces. Even the perimeter edge may be curves around the profile of the guitar body, the surface is still a straight or flat extension from the edge of the front surface to the edge of the back surface.

Previous approaches to incorporate anatomy have been two dimensional line drawn outlines, or interior cutouts on the surface. Some examples may include a heart or alien face shaped pick, or a guitar face with a stencil of a body or image.

SUMMARY

Exemplary embodiments described herein provide for contoured and/or textured instruments and instrument accessories. These configurations and others described herein may provide visual, tactile, and/or acoustic enhancements to instruments and instrument accessories. Other or additional benefits may also provide grip, function, and use enhancements and options.

In an exemplary embodiment, a guitar pick is disclosed having contoured and/or curved surfaces on laterally opposing sides. An outer perimeter of the laterally opposing sides defining the pick profile and peripheral edge. The laterally opposing sides coming together at the peripheral edge to define multiple striking points that may vary in curvature, angle, and thickness, as may be naturally occurring or desirable. Picks interior ridges, depressions, or angles may provide improved comfort and/or grip as well as providing a variety of picking or strumming options. Stringed Instruments may provide improved comfort and/or strength due to the natural curves and improve playability as well as provide an infinite variety of visual and acoustical options as occur in nature, fashion, etc.

These products may also provide an optional variety of individualized enhancements such as anatomical elements (subject, torso, face, etc.) and positions, body art (piercing, tattoo, branding, etc.) and accessories such as clothing, lingerie, jewelry, etc. equivalent to the variety of the natural or anatomical elements and/or fashion. These options may provide additional sales opportunities by allowing the consumer to participate in the pre-production design (e.g. model, position, body art, sound hole shape or location, integrated clothing, surface material, texture, finish, etc.) or following production by purchasing stencils, stickers, clothing, jewelry etc. allowing personalization. Addition of clothing (not integrated into the instrument surface) may alter the instrument tone providing a desired muted or muffled sound.

Computer Aided Design and Manufacturing (CAD/CAM) options may allow accurate or enhanced duplication of natural or imagined, accurate or stylized (drawings, paintings, animation, 3D animation, models, 3D models, sculptures, etc.) natural or anatomic forms in a broad variety of sizes and materials to meet custom or mass production volume requirements. Acoustical software mapping and planning of the interior instrument chamber and/or sound hole location(s) and size may optimize strength and/or acoustic or percussive properties for various instrument sizes and shapes.

Display options and products may also be designed in CAD/CAM 3D and made of various materials. These may also vary widely from pick jewelry designed utilizing clothing designs, body art, etc. to hold, position, and/or pierce the pick providing a means of transforming it into an earring, pendant, keychain, or other form of jewelry or accessory, to customized instrument hangers, stands, cases, etc. It is also possible based on the terminal ends of the anatomical section to allow the instrument to stand on its own.

BRIEF DESCRIPTION OF THE FIGURES

FIGS. 1A-1B illustrate an exemplary stringed instrument pick design having contoured or curved opposing lateral surfaces.

DETAILED DESCRIPTION

Figure 2A:
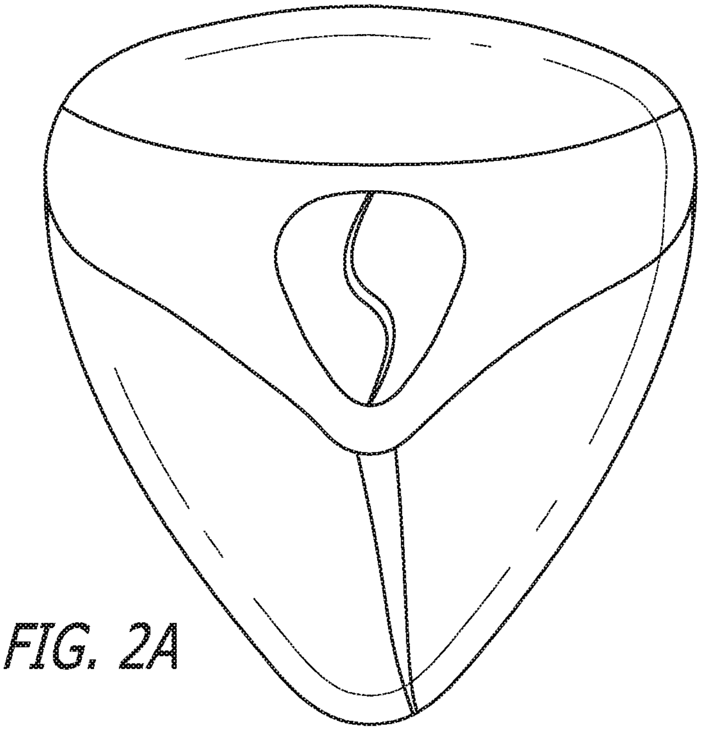
FIGS. 2A-2E illustrate an exemplary stringed instrument pick according to embodiments described herein.
Figure 2B:
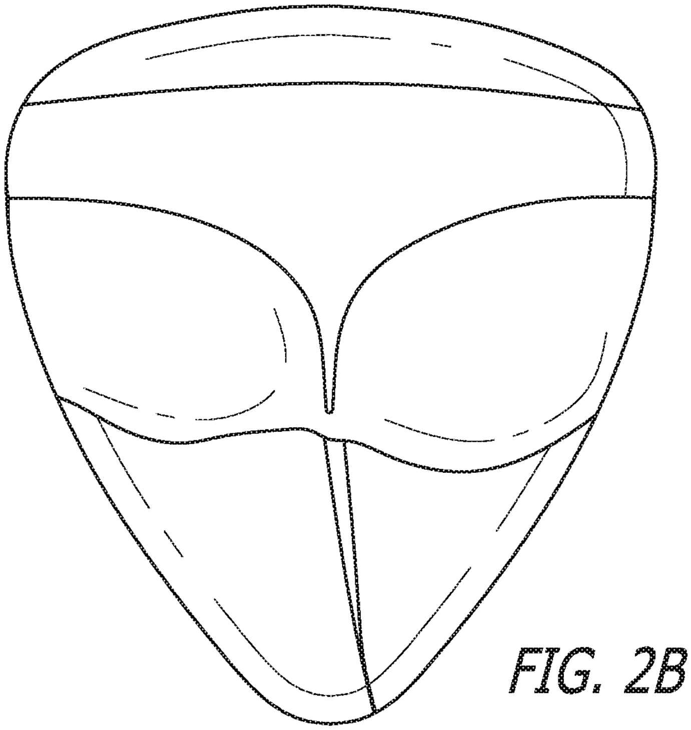
Figure 2C:
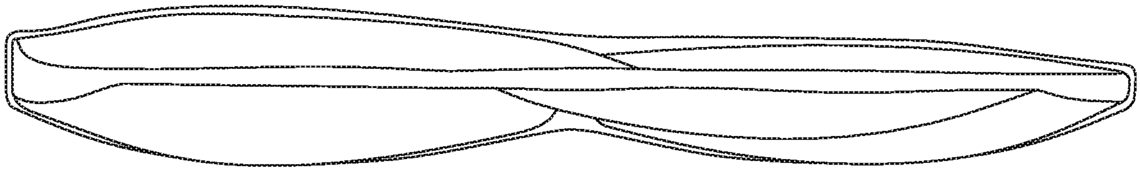
Figure 2D:
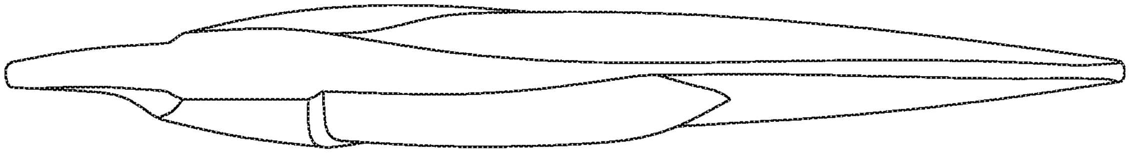
Figure 2E:
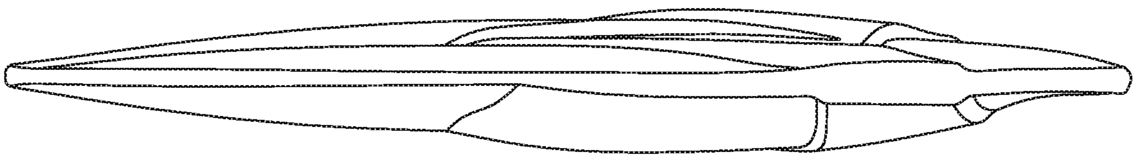

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

The invention may be a stringed instrument, pick, or their associated accessories designed using an actual or imagined, accurate, enhanced, or stylized three dimensional natural or anatomical sculptural shape as the basis of one or more of their components. Each shape may provide opportunities for variation of the products visual appeal, grip, touch, or feel (comfort and playability), as well as acoustics. By providing a variety of products, it is possible for a musician to identify products that provide the fit, feel, acoustical properties, and visual appeal that they prefer. It is also possible for the designer/manufacturer to obtain the musician's unique dimensions and product requirements, and to use these to recommend or customize products to fit. Each product provides the musician with the option to further enhance the product through the addition of body art, fashion, or optional methods of wearing (jewelry) or displaying the product. Exemplary embodiments are provided herein for right handed players, and include mirror image designs for left handed players.

Exemplary embodiments include three dimensional (3D) contoured picks with convex surfaces, concave surfaces, and combinations thereof on opposing lateral sides bounded by an outer perimeter that also provides curved, straight, and combination edges. The curved surfaces may provide additional surface area over a given cross section to create a greater or easier contact for a player with the stringed instrument. The selected angle of curvature may be made to achieve the desired contact, such as for getter grip, smoother release from the string, etc. Therefore, the selection may be made along one or more surfaces or edges to create a combination of better contact, greater "grab", easier or smoother strokes, etc.

Exemplary embodiments described herein are primarily in terms of guitar picks. However, the invention is not so limited. The acoustic, tactile, visual, and other benefits described herein are also applicable to other instruments. Also, generally the contoured surfaces are in terms of anatomical and/or natural forms. However, any contoured or three dimensional surface may be defined that achieves one or more benefits described herein. The disclosure should not be limited by the exemplary embodiments selected to describe characteristics of the invention. Instead, the invention is defined by the claims, and exemplary features from the specification should not otherwise limit the claims recited herein.

FIG. 1 illustrates an exemplary stringed instrument pick design having contoured or curved opposing lateral surfaces. Exemplary embodiments may also include surface contoured stringed instrument picks 100. The surface contour may be either grove(s), hole(s), indentation(s), curved or altered surfaces, continuous and discontinuous features, concave and convex surfaces, and combinations thereof.

In an exemplary embodiment, the contoured stringed instrument pick 100 includes a hole 102 in a central region of the pick. One or both sides of the pick includes a 3-D contoured surface, including front face 104 and back face 106. The 3-D contoured surfaces 104, 106 are defined by one or more groves 108 originating proximate or from the hole 102 and extending outward to a peripheral edge 110 of the pick. In an exemplary embodiment, three such grooves radiate from the hole toward different or corners and/or edges of the pick on the front surface. Additional grooves may also radiate from the hole toward the same side as another groove. The 3-D contoured surface may be generally curved between adjacent grooves. An area between the grooves may be generally concave (indented inward/indention) or convex (indented outward/bump). One or more of the radiating grooves may extend to the edge of the pick or may terminate before the edge of the pick. In an alternate embodiment, the pick does not include a hole. In this case, in place of the hole, the surface may be an indentation defining a total minimum or local minimum thickness in place of the hole.

In an exemplary embodiment, the pick may include a peripheral edge 110 defining a generally triangular shape with three edges 112 and three corners 114. The three corners 114 may have different configurations, such as different degree of taper between the opposing surfaces 104, 106, different radius from adjacent edges, etc. The three edges 112 may similarly have different configurations, such as different degrees of taper between the opposing surfaces, different thickness, different curvatures along the edge, different surface contours adjacent the edge, etc. The illustrated exemplary embodiment includes three edges 112 and three corners 114. However, additional edges and/or corners may be incorporated.

Different visual suggestions may be created by the contoured pick surface. One exemplary embodiment suggests the hip/buttock region of a female, such as from lower torso to upper thigh. The design subject was chosen because it contains several subtle functional design elements that make the pick extremely playable. The crossed legs create alternate convex curves (top and bottom, right and left) extending from the tip. These curves provide improved contact and smooth release from various playing angles on both up and down strokes. The rear hip/buttock is a convex curved surface area providing excellent contact and smooth release at any angle. The front of the hip is a gentle concave curve that provides improved contact and smooth release for the alternate stroke angle. Using the right or left hip provides the player the option of using inside or outside curves on up or down strokes based on preference or desired attack. The indentations forming the delineations between the legs and body portions provide easier gripping structures. The grooves provide a natural holding pattern for the fingers on the pick that permits less pressure to hold and use the pick. Therefore, the player is less fatigued. Also, when a finger/thumb is inserted into a groove it becomes a fulcrum as the grooved projections may also providenatural fulcrums or pivot points or axis permitting the pick to be more responsive to pressure and motion when played.

As illustrated in FIGS. 1A-1B, the suggested anatomical features maintain the central minimum thickness in an interior region of the pick. FIG. 1A illustrates a first side of a contoured pick, while FIG. 1B illustrates a second side of the contoured pick. Three groves emanate from the central minimum toward respective edges of the pick periphery. The grooves may extend to the edge or may terminate before the edge.

The grooves on the front surface may be in a different pattern than the grooves on the back surface. For example, the front surface 104 may include two grooves projecting from an interior region toward adjacent sides of the pick adjacent to or approximate the corners, while a third groove extends from an interior region toward another edge, either the same or different from the previously described edges in which the other grooves project. The third groove may extend toward an edge toward a point closer to a corner than the middle of the edge, or approximately a quarter of the way from the corner of the edge. The resulting groove patter appears to form crossed-legs as viewed from a front of a person. The back surface 106 may also include at least three grooves extending from the interior region toward respective edges of the pick. The grooves may form curved lines meeting or approaching each other near the center of the pick. The curved grooves may terminate near the middle of the edge. Therefore, two arced grooves are positioned on a back side of the pick which the terminal end of a groove is approximate the middle of a pick edge and the other terminal end of a groove is approximate the middle of an adjacent pick edge. The pick surface enclosed by the grooved arc and the portion of the perimeter edge defining at least one corner defines a convex surface.

The internal curves, lines/depressions provide ultimate control with excellent grip angles, improved comfort, and reference points when playing with any of the three tips and for rapidly alternating between them. The design has unlimited variability based on the subject, pose, angle of perspective, etc. allowing all of these design aspects to be adapted to various playing styles and techniques. For example some players may prefer outside curves on both sides of one or both hip curves and left handed players may prefer the legs crossed in reverse to the exemplary photographs.

FIGS. 2A-2E illustrate an exemplary stringed instrument pick according to embodiments described herein. The exemplary stringed instrument pick of FIG. 2 include contoured opposing surfaces. The illustration of FIG. 2 includes additional grooves, projections, and relief as compared to FIG. 1. The illustrated embodiment includes at least three grooves extending from an interior region (a central portion as illustrated) toward the peripheral edge of the pick. The primary grooves provide a relief of a portion of a body. Additional relief is provided to represent clothing or other attributes over that created by the primary relief. The resulting contoured surfaces include different sections of convex surfaces and an indented interior region. As shown, the additional relief portrays a bikini or underwear. Other relief may include branding, names, symbols, etc. The body, clothing etc. may also be incorporated or enhanced through printing in single or multiple colors.

Figure 3A:
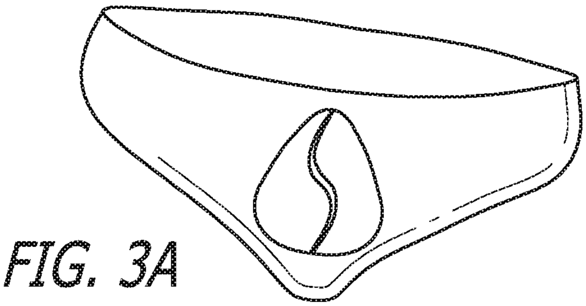
FIGS. 3A and 3B illustrate an exemplary embodiment in which the stringed instrument pick 300 comprises separable components.
Figure 3B:
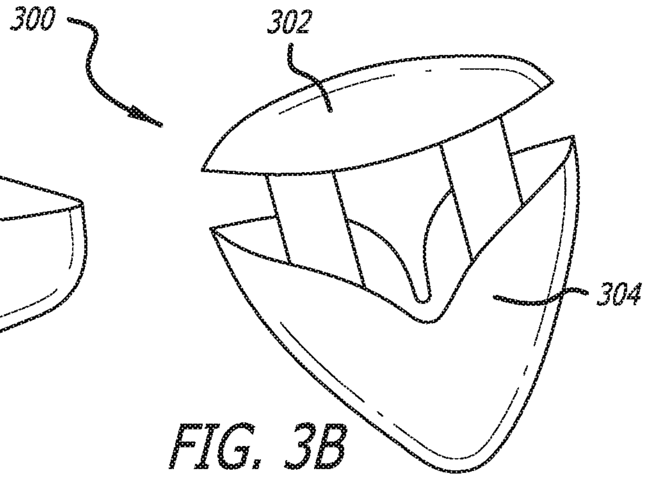

FIGS. 3A and 3B illustrate an exemplary embodiment in which the stringed instrument pick 300 comprises separable components. A first component may provide a first material, and/or set of features, such as a desired curvature, angle, thickness, strength, appearance, color, texture, or other feature, while a second component may provide a second material, and/or set of features, such as another, different desired curvature, angle, thickness, strength, appearance, color, texture, or other feature. The components may be integrated together during production or may be interchangeable as desired by the manufacturer or user. Therefore, a musician can customize a single pick to provide different performance characteristics by using different materials and/or set of features in portions or regions of the pick.

Figure 4:
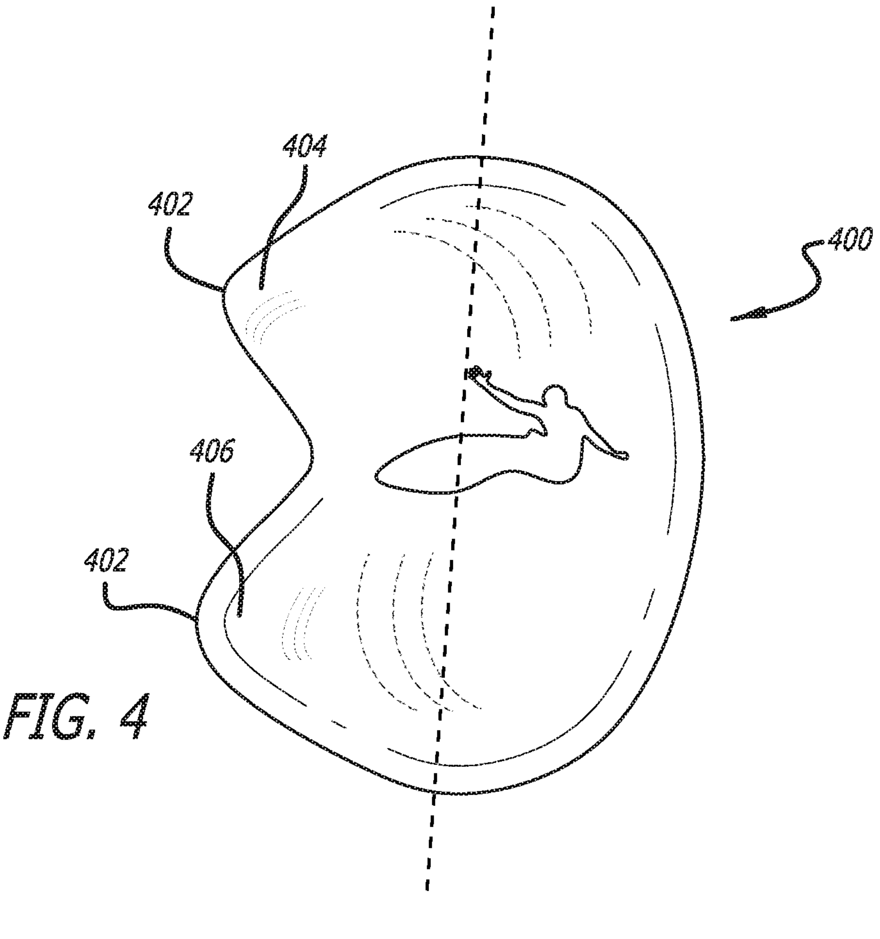
FIG. 4 illustrates an exemplary contoured surface pick comprising two or more tapered sections directed in generally the same direction, along one side of the pick.

FIG. 4 illustrates an exemplary contoured surface pick 400 comprising two or more tapered sections 402 directed in generally the same direction, along one side of the pick. The pick including a curved perimeter from the outside of the tapered sections around at least 50-75% of the pick (i.e. along three sides or directions of the pick). Wherein the two tapered sections include different degrees of taper, different slopes along opposing surfaces, and different curved terminal ends to define different point profiles, and any combination thereof. The contoured surface comprising a first side having a generally concave portion 404 adjacent a first tapered section 402 and a generally convex portion 406 adjacent the second tapered section 402.

In an exemplary embodiment, the first and second tapered sections 402 are out of plane from each other. Therefore, the curved portions 404 and 406 are generally concave and convex, respectively, to define a semi-spiral like shape. As seen, for example, in FIG. 4, the dashed lines generally indicate a curved surface and the different directions indicate the different curvatures of the surface. For example, as the pick is traversed from one side to an opposing side, such as along the vertical dashed line, where both the first and second tapered sections 402 are on the same side of the traversal line, the surface of the pick forms a general S shape in that along a first portion the surface is curved in a first direction (i.e. concave on the upper portion) and along a second portion the surface is curved in a second direction opposite the first direction (i.e. convex on the low portion). The S shape need not actually curve back along itself, but would include a curve similar to an approximation symbol (—).

Figure 5A:
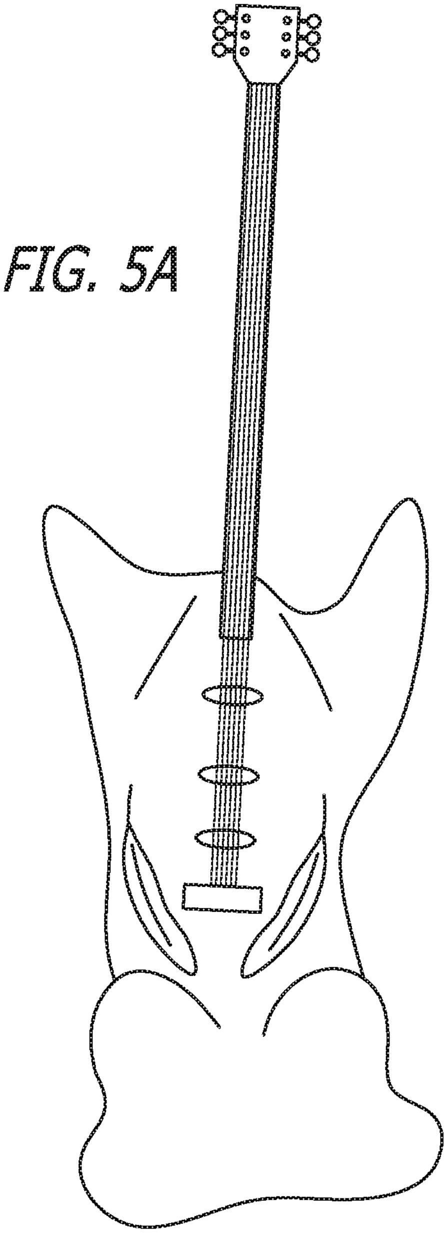
FIGS. 5A-5B illustrate an exemplary acoustic instrument in which the acoustic cavity defines or is defined by a portion in the shape of natural or anatomical form.
Figure 5B:
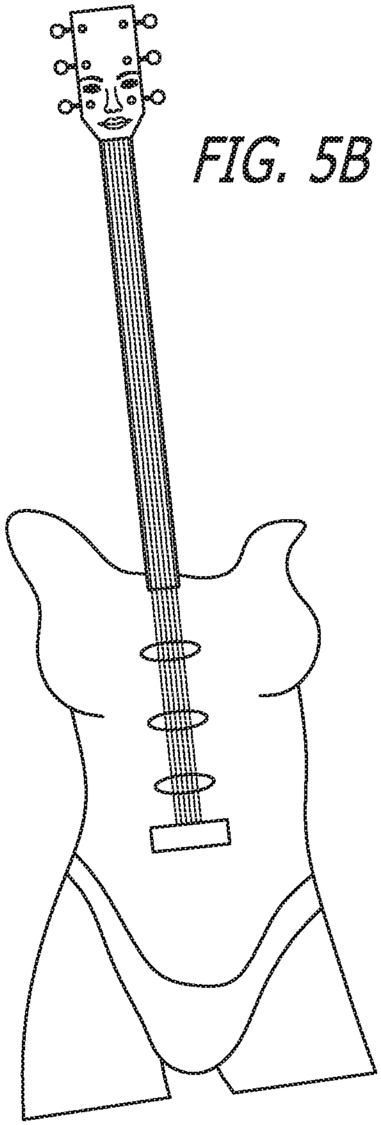
Figure 6A:
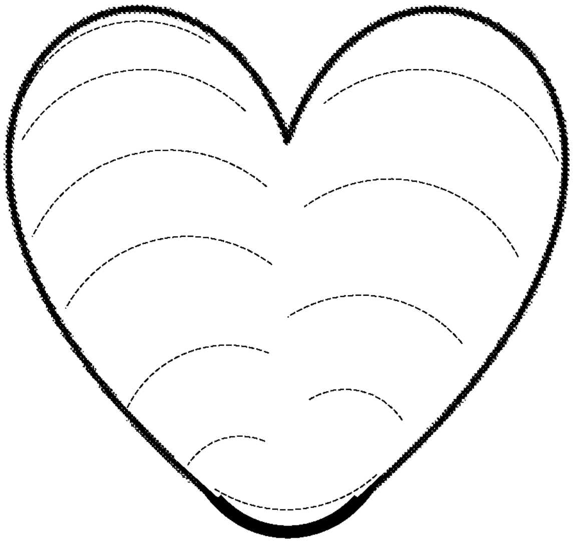
FIGS. 6A-6B illustrate exemplary pick configurations according to embodiments described herein.
Figure 6B:
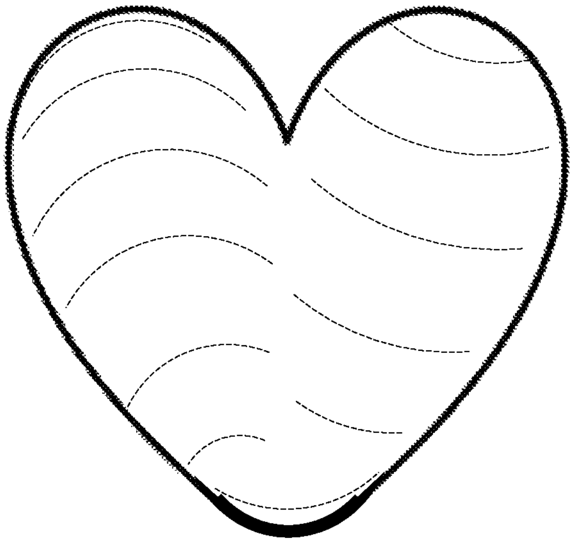

FIGS. 6A-6B illustrate exemplary pick configurations according to embodiments described herein. Similar to FIG. 5, the outer perimeter of the picks of FIGS. 6A and 6B provide for striking points on a same side of the pick. As shown, another striking point is provided on an opposite side of the pick. The striking points may define different perimeter curvatures, thicknesses, slopes, widths, flexibilities, and combinations thereof. FIG. 6A illustrates an exemplary embodiment in which the contoured surface defines two convex curved surfaces on opposite side portions of the pick coming together in a central region. The coming together of the surfaces defines an elongated indentation similar to those of FIGS. 1A-1B. The convex curved surfaces may have the same or different degrees of curvature. FIG. 6B illustrates an exemplary concave and convex curved surfaces similar to that of FIG. 4 to create an S shape across the surface of the pick.

In an exemplary embodiment, the first and second tapered sections define a first and second striking point for the exemplary pick. The first and second striking points may define different curved surfaces, thicknesses, angles of curvature, widths, perimeters, flexibilities, and combinations thereof.

In an exemplary embodiment, the first and second tapered section define a separation distance. The separation distance may define a first separation distance in a first orientation and a second separation distance in a second orientation. For example, when the pick is oriented generally horizontally, as seen in FIG. 4, the vertical separation distance may define the first separation distance, while the horizontal or in the plane of the page separation distance may define a second separation distance. The separation distance may be such that the pick is configured to span an interval of string distance such that the pick may strike two strings simultaneously. The separation distance approximates a single string distance such that adjacent strings may be struck simultaneously. The separation distance may span a multiple of string distances such that alternate strings (non-adjacent strings) may be struck simultaneously. In an exemplary embodiment, the separation distance approximates both a single string distance and a plurality of string distances depending on the orientation of the pick. In an exemplary embodiment, the first and second tapered portions are configured to simultaneously strike the same string. Therefore, the first and second tapered portions may fall along the same line.

In an exemplary embodiment, the pick is configured that when a thumb is positioned within the concave curve of a first side of the pick, the first and second tapered portions define striking points that are aligned such that the pick is configured to simultaneously strike one or more strings. The pick may also be configured that when the pick is flipped and a thumb is positioned within the concave curve of a second side opposite the first side of the pick, the first and second tapered portions are at angles to each other and do not define a simultaneous striking line.

Exemplary embodiments described herein use convex and concave curves to decrease or increase drag. Compound curves (i.e., a convex curve across a concave curve, or two convex curves) decrease drag and insure consistent contact. Internal dimensions increase surface area, while valleys and depressions lock fingers and/or thumb into a desired position for enhanced grips, eliminating twisting or turning. The locking of digits into desirable positions creates fulcrums (points or axis) which allow the pick to pivot. This pivot allows the player to vary their sound ("attack") by either relaxing the grip (decreasing drag) and allowing the pick to "float" across the strings, or applying leverage (increasing drag) and digging into the strings. The ability to alternatively relax the grip or apply a desired leverage while maintaining the pick in the desired position reduces fatigue and provides complete control over their sound and confidence in the tool. The ability to quickly lock digits into position is especially important to players who combine finger-picking and picking or strumming with a pick. This positive engagement insures that they can, with confidence, immediately grip the pick in the desired position while maintaining the timing of the musical score.

FIGS. 5A-5B illustrate an exemplary acoustic instrument in which the acoustic cavity defines or is defined by a portion in the shape of natural or anatomical form. As shown, the body portion is configured as a body section of a human or woman. The acoustic cavity of the instrument is shaped to correspond with the represented body portion, such that the image is not simply a planar image or carved exterior impression on the exterior of a conventional acoustic instrument shape. In an exemplary embodiment, the acoustic cavity includes interior walls that are curved on front and back sides. In an exemplary embodiment, the interior cavity does not include discontinuous joints or intersections.

In an exemplary embodiment, the acoustic instrument may be crafted in multiple parts. For example, a front and back section may be crafted separately. Both the front and back section may define a three dimensional surface so the edges around a peripheral edge may be smooth or curved and provide ergonomic and/or non-abrasive contact surfaces for the user. In the exemplary embodiment, a seam may be defined between the front and back sections along or within a central region circumscribing an exterior periphery of the instrument body in approximately a central or mid region of the instrument around the thickness dimension (from front to back relative to the user's body when in the played position).

In an exemplary embodiment, the acoustic instrument may comprise one or more combinations of materials and contours. In an exemplary embodiment, the acoustic instrument comprises a frame. One or more other materials may be positioned over the frame to provide percussively distinct zones on the instrument body. In an exemplary embodiment, the frame may define one or more openings. The one or more openings may be covered with a flexible material and used as an integrated percussive surface on the acoustic instrument body.

Manufacturing begins with design. Natural or anatomical sculptural designs may be created from drawings or images, models or sculptures, created traditionally or digitally in two or three dimensions either directly in digital software or imported via scanner (such as a 3D scanner), camera or other method into a digital CAD (Computer Aided Design)/CAM (Computer Aided Manufacturing) software program for 3D modeling, design, sculpture and/or manufacturing (e.g. Solid Edge, Solid Works, or an Autodesk product or products). Here (or using an intermediate image software such as Photoshop, etc.) the images may be aligned, registered, manipulated, enhanced, and engineered as needed to attain the desired form, durability, fit, acoustic and visual appeal. This process is commonly referred to as the 3D pipeline. Products may further be designed and engineered to be manufactured as single units or as multiple components as desired.

A pick, instrument, or accessory may be created of various materials including but not limited to wood, stone, bone, shell, metal, glass, plastic, resin, fiberglass, carbon fiber, cloth, leather, rubber, vinyl, cork, paper, felt, composites, plastics, leather, acrylic, or similar materials or a combination of materials. Exemplary embodiments may include coverings, coatings, veneer, etc. to provide a composite pick, instrument, or accessory.

An exemplary embodiment of a pick according to embodiments described herein includes compositions for defining various flex modulus. For example, a pick may be made of acetal, polyoxymethylene having a flex modulus of 420K, of polyamide having a flex modulus of 440K, of polycarbonate, or of aliphatic polyketone having a flex modulus of 150K for a rigid pick. A pick may be made of polyester based thermoplastic elastomer (TPE) having a flexure modulus for example of 20K-90K, such as 30K, or of CoPolyester based thermoplastic elastomer (TPE-TPC-ET having a flexure modulus of approximately 20K-100K such as 30K or 99K, for a moderately flexible pick. Exemplary materials include Delrin, Nylon 6/6, Polycarbonate, Texin 270, Permastat 4500, Skypel G155D, Skypel G172D, Resmart TPU, Keyflex 1055, Keyflex 1072, Polypropelene, and combinations thereof. Exemplary embodiments of a flexible material include a material having a shore hardness of between 30 and 90.

Based on the 3D digital model design(s), the pick, instrument, or accessory may be created through direct CAD/CAM manufacture in one stage such as CNC (computerized numerical controlled) machining, 3D printing, laser or water jet cutting, casting, punching, and any other method for the material selection. It may be desirable to design cutouts or hollows and/or bracing to improve comfort, reduce weight, increase strength, allow insertion of electrical wiring and components, strengthen attachment points, or components, etc. This may require the product to be manufactured as multiple components (headstock, neck, body) or for one or more components to be made in two or more pieces. Instruments or components may also be produced by creating mold(s), cast(s), or die(s) based on the 3D design allowing one or more processes such as molding, injection or vacuum molding, steam bending, pressing, lamination, extrusion, etc. Additional modification of surfaces may be desirable to enhance texture, reproduce or otherwise include clothing, body art, painting, staining, coating, sealing, etc. Instruments and picks and associated accessories may also be otherwise designed, and manufactured by taking direct molds of models, by hand, etc. although achieving the same cost efficiencies, design flexibility, or other qualities would be significantly more difficult.

Instrument components may be manufactured using methods and materials previously mentioned. Bodies may be manufactured based solely on the natural or anatomical contours of the design or may have cutouts or hollows for improved comfort or component placement. The interior chamber strength or acoustics may be enhanced through the use of ribs, bracing, membranes, creation of multiple chambers, or other methods as may be desired. Sound holes may be shaped and placed based on anatomic or body art inherent in the model. In an exemplary embodiment, a lower back or shoulder tattoo may be of appropriate size and location to be used as a sound hole. Acoustic mapping and/or modeling software may also be used to optimize the shape and placement of the internal chamber or chambers, or the shape and placement of ribs, braces, sound holes, membranes, etc. In addition to resonating sound, acoustic instruments are also percussive. The percussive attributes may be enhanced through acoustic mapping, subdivision, or partitioning of the internal chamber (using membranes or other means) with internal or external sound holes to provide improved percussive tone(s) or create sympathetic tonal qualities when interacting with string resonance.

In an exemplary embodiment, molds are produced based on the 3D modeling. Using the molds, the instrument (section or component) is created as a lamination consisting of a core of at least one layer of carbon fiber (or other non-wood material) with at least one layer of veneer (preferably wood) on at least one surface (interior or exterior) and preferably both. The sound hole may be a cut out or made of at least one solid piece of wood inserted into the body. The instrument may appear to be made of solid wood if desired while providing a surface capable of accepting a traditional finish (clear, paint, stain, burn, etc.) as may be desirable. Because of the strength of the carbon fiber core and the inherent strength of the anatomical curves, the need for structural support (internal ribs, bracing, etc.) may be reduced or eliminated unless desired. Carbon fiber instruments produce a very strong but somewhat crisp tone. Therefore, by adding the layer(s) of wood, this tone may be softened to provide a tone closer to that of a traditional wooden instrument. Any combination thereof may also be achieved.

Based on the 3D digital model custom fit accessories may be designed to replicate or enhance the model and/or to protect or enhance the instrument, or its acoustics. Accessories may include but are not limited to carrying cases, stands, hangers, clothing, stencils, stickers, magnets, jewelry, pick holders, pick guards, shoulder straps, etc. Accessories may be purely decorative or may protect or enhance the product by protecting it from damage (cases, pick guards, etc.), altering acoustical properties (capo's, slides, etc.), altering grip, adhesion or storage (picks, slides, capos, etc.), or provide options and/or guides for end user modifications.

The stringed instrument market particularly for guitars has been declining due to the increased popularity of electronic dance music. Decreasing sales puts manufacturers in a position to find new markets and/or revenue streams. These unique picks and instruments along with the accompanying personalization and accessories create alternative revenue streams as well as the ability to expand into new markets (apparel, jewelry, gaming, etc.) directly or through joint marketing/partnering opportunities. The unique and unlimited variation of natural and anatomical instrument and pick forms and their associated accessories insures that these products and accessories will be able to continually adapt to changing tastes in form and fashion providing new sales opportunities as well as ongoing demand for updated customizations and/or accessories following core product sales.

Visual appeal and variation, size (fit, feel, and playability), acoustic variation, strength, the ability to accessorize, customize, or otherwise enhance the product for any of these characteristics or for purely decorative, or display purposes may provide unlimited variety for musicians and unlimited design, marketing, partnership opportunities, and new markets for manufacturing, marketing, sales and distribution. For example, a musician may desire a product in the form of a favorite model, may wish to accessorize with jewelry, a swimsuit or lingerie product worn by the model providing new markets and allowing multi-product packaging, up-sale, resale opportunities and/or joint marketing/partnering opportunities. In another example a video game, cartoon, comic book, etc. having appealing character(s) may partner with the manufacturer to produce products designed to promote a product or brand, again providing new markets with multi-product packaging, up-sale, resale and/or joint marketing/partnering opportunities. All of these benefits may be combined with streamlined engineering and highly automated manufacturing to provide superior product quality while reducing costs and allowing consumer customization prior to or following production. Continuous changes in consumer taste and fashion combined with the ability of these products to adapt may provide ongoing sales and resale opportunities.

Two dimensional replication or outlines of natural or imagined anatomical forms do not provide the same design options, visual appeal, acoustic variation, strength, fit, feel, playability, customization options, or the resulting enhanced business model that may be achieved with sculptural three dimensional surfaces.

Exemplary embodiments described herein may include any combination of features and does not require any one or more feature described herein. Similarly, any combination of features are included within the scope of the invention, including adding, removing, duplicating, integrating, or subdividing any feature of element.

What is claimed is:

1. A pick comprising:

a first contoured side;

a peripheral edge defined by an exterior perimeter of the first contoured side, wherein the peripheral edge defines two corners for striking a stringed instrument on a same side of the pick, the peripheral edge defining a gap between the two corners so that the two corners are configured to simultaneously strike two different strings of a stringed instrument in which the pick is used to play, wherein the first contoured side defines a concave surface and a convex surface along a reference line traversing the pick, where the two corners are on the same side of the reference line traversing the pick.

2. The pick of claim 1, wherein a plane traversing one of the two corners containing the peripheral edge of the pick at the one corner is out of plane from a second plane traversing another of the two corners containing the peripheral edge of the pick at the another of the two corners.

3. The pick of claim 1, wherein the two corners are defined by two tapered sections directed in generally the same direction.

4. The pick of claim 3, wherein the peripheral edge defines an inward curve around at least 50 percent of the peripheral edge, and the two or more tapered sections are positioned outside of the inward curve of the peripheral edge.

5. The pick of claim 4, wherein the two or more tapered sections define different point profiles, degrees of taper, curves, or combinations thereof.

6. The pick of claim 4, wherein the first contoured side adjacent the first tapered section of the two or more tapered sections is concave outward, and the first contoured side adjacent the second tapered section of the two or more tapered sections is convex outward.

7. The pick of claim 4, wherein the peripheral edge defines a generally heart-shaped profile.

8. The pick of claim 4, wherein a portion of the peripheral edge defines a semi-spiral shape.

9. The pick of claim 4, wherein the two or more tapered sections are out of plane from each other.

10. The pick of claim 1, wherein the two corners are linearly aligned to strike a same string of the stringed instrument simultaneously when the pick is in a first orientation.

11. A pick comprising:

a first contoured side;

a second side; and a peripheral edge defining an exterior perimeter of the first contoured side, wherein the peripheral edge defines two corners defined by two tapered sections directed in generally the same direction for striking a stringed instrument on a same side of the pick, the peripheral edge is contoured to create a gap between the two corners so that the two corners are configured to simultaneously strike two different strings of a stringed instrument in which the pick is used to play, wherein the peripheral edge defines an inward curve around at least 50 percent of the peripheral edge and the inward curve of the peripheral edge in combination with a curvature of the two or more tapered sections defines a semi-spiral shape.

12. The pick of claim 11, wherein the two or more tapered sections are out of plane from each other.

13. The pick of claim 11, wherein the first contoured side defines a concave surface and a convex surface along a reference line traversing the pick, where the two corners are on the same side of the reference line traversing the pick.

14. The pick of claim 11, wherein the peripheral edge defines an inward curve around at least 50 percent of the peripheral edge, and the two or more tapered sections are positioned outside of the inward curve of the peripheral edge.

15. The pick of claim 11, wherein the two or more tapered sections define different point profiles, degrees of taper, curves, or combinations thereof.

16. The pick of claim 11, wherein the first contoured side adjacent the first tapered section of the two or more tapered sections is concave outward, and the first contoured side adjacent the second tapered section of the two or more tapered sections is convex outward.

17. A pick comprising:

a first contoured side;

a second side, and a peripheral edge defining an exterior perimeter of the first contoured side, wherein the peripheral edge defines two corners defined by two tapered sections directed in generally the same direction for striking a stringed instrument on a same side of the pick, the peripheral edge is contoured to create a gap between the two corners so that the two corners are configured to simultaneously strike two different strings of a stringed instrument in which the pick is used to play, wherein the pick is configured when a reference line is defined through the center of the pick, the two or more tapered sections are on a same side of the reference line, and the first contoured side defines a general S shape as the pick is traversed from the peripheral edge at one end of the reference line to the peripheral edge at an opposite end of the reference line.

18. The pick of claim 17, wherein the two tapered sections are out of plane from each other.

19. The pick of claim 17, wherein the two corners are linearly aligned to strike a same string of the stringed instrument simultaneously when the pick is in a first orientation.

20. The pick of claim 17, wherein the two or more tapered sections define different point profiles, degrees of taper, curves, or combinations thereof.

* * * * *